(12) United States Patent
Lerner et al.

(10) Patent No.: US 7,102,474 B2
(45) Date of Patent: Sep. 5, 2006

(54) ADAPTABLE VIBRATION ABSORBER EMPLOYING A MAGNETORHEOLOGICAL ELASTOMER WITH VARIABLE GAP LENGTH AND METHODS AND SYSTEMS THEREFOR

(75) Inventors: Anne-Marie Albanese Lerner, Smyrna, GA (US); Kenneth A. Cunefare, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 27 days.

(21) Appl. No.: 10/767,144

(22) Filed: Jan. 26, 2004

(65) Prior Publication Data
US 2005/0040922 A1 Feb. 24, 2005

Related U.S. Application Data

(60) Provisional application No. 60/442,241, filed on Jan. 24, 2003.

(51) Int. Cl.
*H01F 5/00* (2006.01)

(52) U.S. Cl. .................................... 335/229; 188/380
(58) Field of Classification Search ............... 335/229; 188/380
See application file for complete search history.

(56) References Cited

U.S. PATENT DOCUMENTS 4,724,923 A * 2/1988 Waterman .................... 181/208
5,947,457 A * 9/1999 Swanson et al. ......... 267/140.14

* cited by examiner

*Primary Examiner*—Elvin Enad
*Assistant Examiner*—Bernard Rojas
(74) *Attorney, Agent, or Firm*—Nora M. Tocups, Esq.

(57) ABSTRACT

The inventions include an adaptive vibration absorber (AVA) and variation thereof including variations in methods and systems of usage. An exemplary AVA may operate adaptively over an appropriate relatively wide bandwidth or frequency range in vibration absorption without adding energy to the system and the problems associated with such energy addition. Further, the exemplary AVA may be of low cost as well sa lightweight and compact.

17 Claims, 3 Drawing Sheets

ADAPTABLE VIBRATION ABSORBER EMPLOYING A MAGNETORHEOLOGICAL ELASTOMER WITH VARIABLE GAP LENGTH AND METHODS AND SYSTEMS THEREFOR

RELATED APPLICATION

This application claims priority to and the benefit; of the prior filed co-pending and commonly owned patent application, assigned U.S. patent application Ser. No. 60/442,241, entitled "Tunable Adaptive Vibration Absorber Employing Magnetics with Variable Gap Length", filed on Jan. 24th, 2003, and incorporated herein by reference.

FIELD OF THE INVENTIONS

The inventions relate to vibration absorbers, and more particularly, the inventions relate to adaptive vibration absorbers including methods and systems related thereto.

BACKGROUND

A vibration absorber generally is a device used to reduce vibration in a structure whose motion is undesirable or whose motion is sought to be minimized. Vibration absorbers are commonly used in vehicles, aircraft, and other mechanisms that carry passengers—at least to provide the passengers with a more comfortable ride as well as for other reasons.

A type of vibration absorber referred to as a tuned vibration absorber (TVA) is used in many applications for the suppression of a specific vibration frequency. TVAs are used in many applications because of their relative low cost and well-established vibration absorption capabilities. TVAs, however, suffer the drawbacks of being passive devices and of being effective only for a relatively narrow bandwidth.

Another type of vibration absorber is the active; vibration controller (AVC). An AVC typically includes real-time property-changing characteristics and therefore can be highly effective. But uses of AVCs is vibration control mechanisms have been limited because AVCs have been costly to implement. Another problem that may arise in the use of AVC is that of an AVC adding energy to the system (and possibly driving the system into instability) in the event of an unanticipated excitation or improper control of the AVC.

Thus, there is a need for a vibration absorber that includes the advantages, but does not suffer the drawbacks of the TVAs nor the limitations of the AVCs. There is a need for a vibration absorber that effectively and essentially eliminates vibration in structures and that is available at low cost with well-established vibration absorption capabilities. There is a need for a vibration absorber that may adaptively operate over a frequency range without the problems associated with adding energy to the system. Further, there is a need for a vibration absorber that is lightweight and compact.

SUMMARY

Stated generally, the inventions include an adaptive vibration absorber (AVA), and methods and systems therefore. Advantageously, the inventions provide an AVA that may effectively and essentially eliminate vibration in structures. The inventions provide an AVA that may operate adaptively over an appropriate relatively wide bandwidth or frequency range without adding energy to the system and the problems associated with such energy addition. Further, the inventions provide an AVA that may be of low cost as well as lightweight and compact.

DETAILED DESCRIPTION

Several exemplary embodiments of the invention are described below in detail. The disclosed embodiments are intended to be illustrative only since numerous modifications and variations therein will be apparent to those of ordinary skill in the art. In reference to the drawings, like numbers indicate like parts continuously throughout the views. As utilized in the description herein and throughout the claims that follow, the meaning of "a," "an," and "the" include plural references also, unless the context of use clearly dictates otherwise. Additionally, the meaning of "in" includes "in" and "on" unless the context clearly dictates otherwise as the term is utilized in the description herein and throughout the claims that follow.

Generally stated, the inventions include adaptive vibration absorbers (AVAs) and methods and systems therefor. An AVA of the inventions may be considered a hybrid between a tuned vibration absorber (TVA) and an active vibration controller (AVC). The AVA includes the "active" characteristics of the AVC in that the AVA may be caused to operate selectively over a range of frequencies rather than a single frequency. One or more elements of the AVA is able to almost instantaneously and discretely change properties, thus increasing the effective bandwidth of vibration suppression by the AVA. The AVA operates like a TVA when the AVA has been set (via control algorithm or otherwise) to operate at a certain frequency.

Advantageously, the hybrid nature of the AVA may make it superior to the AVC and the TVA. The AVA may be considered) to be superior to an AVC because the AVA allows switching in frequency absorption to occur only at discrete times and to discrete states. Thus, the risk of adding energy to a system is virtually eliminated because the AVA behaves like a TVA between switches. The AVA may be considered superior to a TVA because the TVA may operate at more than one frequency.

The ability of the AVA of the inventions to operative selectively over a range of frequencies is brought about, in part, by the lack of geometric restraints on the AVA, and particularly, with regard to the lack of geometric constraints on certain elements of the AVA as explained below. These elements may change properties thereby increasing the bandwidth of vibration suppression by the AVA. Rather than geometric boundary conditions, the AVA may operate through the principles of force balance with respect to its elements to achieve its advantages.

Figure 1:
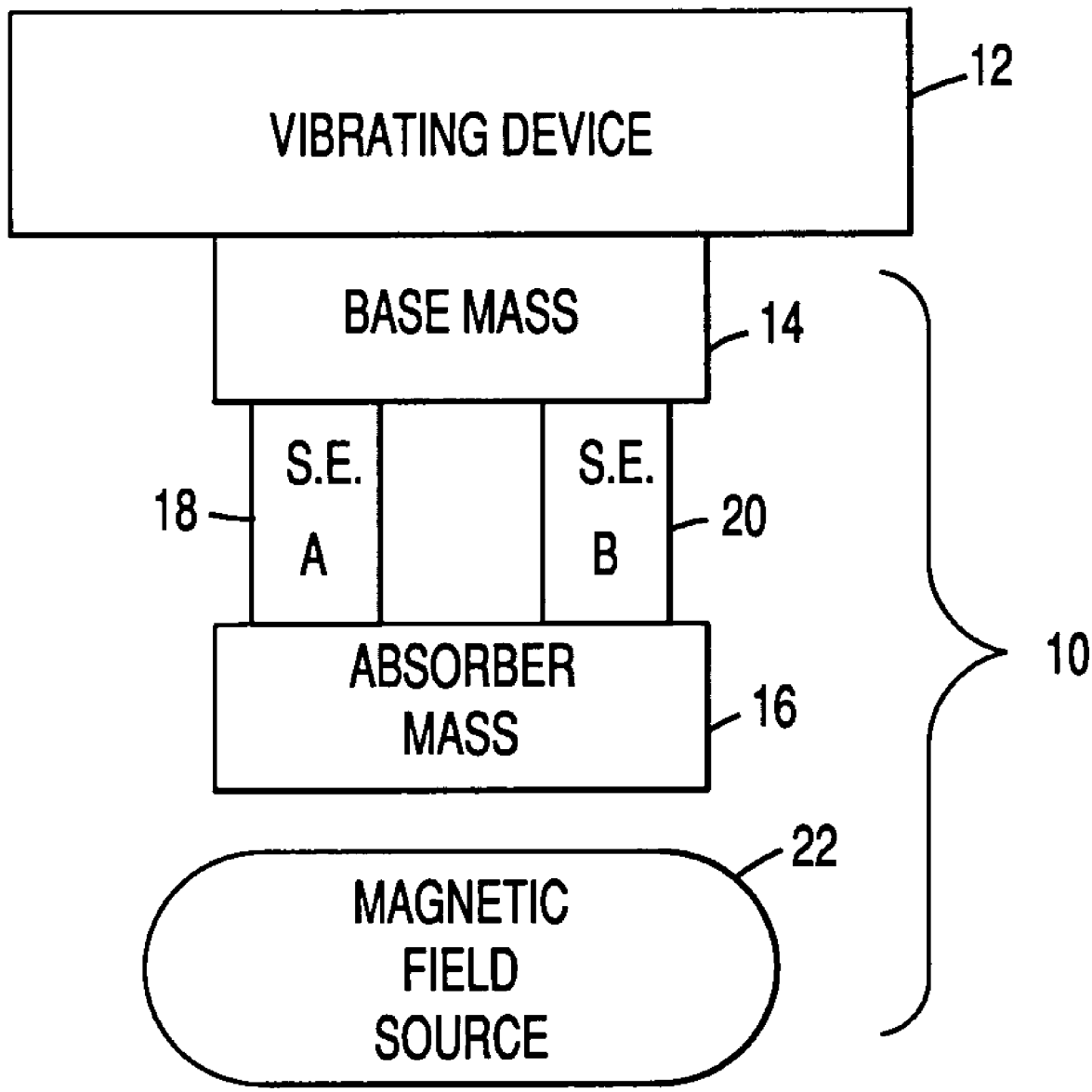
FIG. 1 is a block diagram illustrating by function an exemplary embodiment of the inventions in use with a vibrating device.

FIG. 1 is a block diagram that is used to illustrate the functions of an exemplary embodiment of an AVA 10 of the inventions as used with a vibrating device 12. The blocks illustrated in FIG. 1 correspond to functions of the involved elements and devices. The blocks are not to be interpreted as relative sizes of the elements or devices. In fact, reference to the other figures of this patent application demonstrates that the elements of the exemplary AVA 10 may vary in size, shape, and other characteristics. The exemplary AVA 10 is configured of the elements including a base mass 14 and an absorber mass 16 connected by a pair of switching elements 18, 20 that function effectively as tunable springs and may be held responsible for the advantageous bandwidth increase in vibration suppression by the AVA 10.

The configuration and composition of the elements 14, 16, 18 and 20 of the exemplary AVA 10 provide a path (also referred to as magnetic circuit) for magnetic flux that may be induced by a magnetic field source 22 connected to, disposed on or around, or located close to the exemplary AVA 10. Specifically, the magnetic circuit through the elements of the AVA 10 may originate with the magnetic field source 22 and pass through the absorber mass 16, to one of the pair of switching elements 18 (referred to as switching element A or S.E. A), to the base mass 14, to the other of the pair of switching elements 20 (referred to as switching element B or S.E. B), and so on.

The switching elements 18, 20 of the exemplary AVA are oriented in such a way that their static deflection lengths are determined by a force balance rather than geometric boundary conditions. When the source 22 provides the magnetic field and flux travels through the described magnetic circuit, the static deflection length in each of the pair of the switching elements 18, 20 changes based on force balances and allowed at least in part because there are no geometric constraints on the elements 18, 20. Because the static deflection length is determined by a force balance, an increase in the magnetic attractive force causes the status deflection lengths of the switching elements 18, 20 to decrease and achieves a larger natural frequency shift than the same system limited by geometric boundary conditions. In this manner, a change in the applied magnetic flux may be used to change the frequency of vibration absorption by the AVA 10. This change may be controlled as necessary or desired via a control algorithm applied through a processor (not illustrated) or otherwise.

As noted, FIG. 1 illustrates the functional configuration of the elements of the exemplary AVA 10 of the inventions. A description of exemplary compositions of the elements of the exemplary AVA 10 is now provided.

The exemplary AVA 10 includes a base mass 14 that may serve as, an attachment point to the vibrating device 12. The exemplary AVA 10 may be hung in tension from the vibrating device 12 such as being hung from the vibrating device 12 by attachment to the base mass 14 of the AVA 10.

Figure 2:
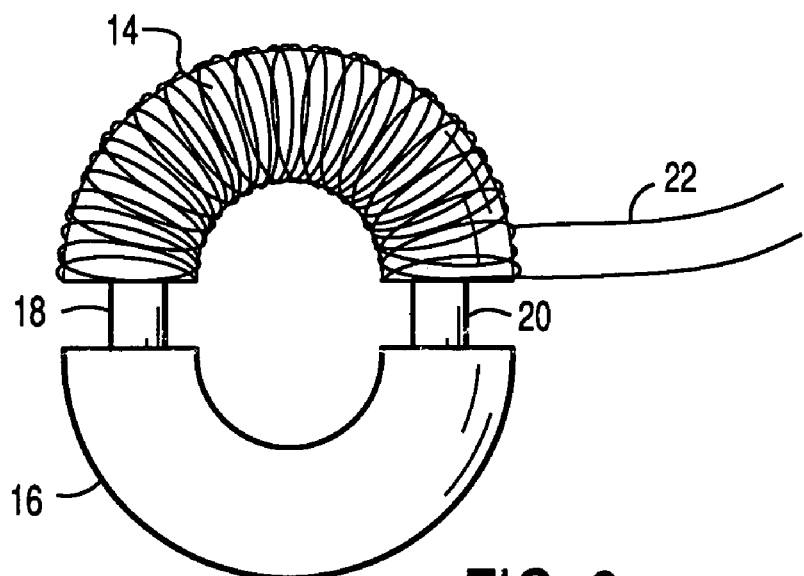
FIG. 2 is a drawing of an exemplary embodiment of the inventions.
Figure 3:
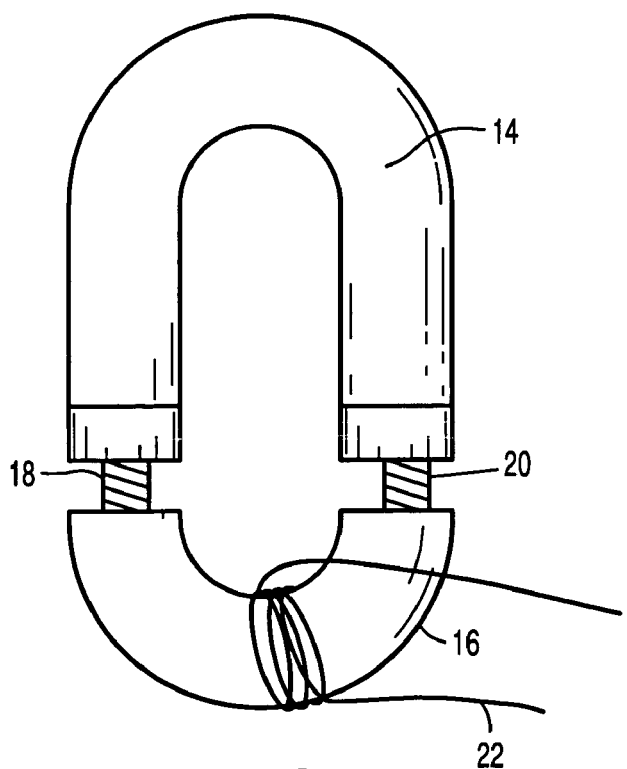
FIG. 3 is a drawing of another exemplary embodiment of the inventions.
Figure 4:
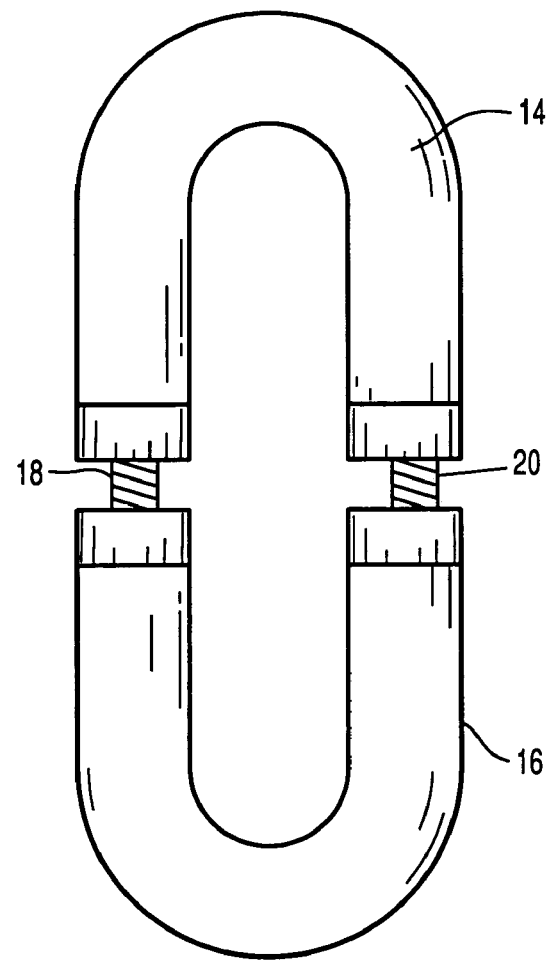
FIG. 4 is a drawing of another exemplary embodiment of the inventions.

The base mass 14 as well as the absorber mass 16 in the exemplary embodiment are of made of relatively rigid, magnetically-conducting material such as iron or low carbon steel. One of the masses 14, 16 may be a permanent magnet. The masses 14, 16 may be of any appropriate shape such as the rectangular shapes illustrated in FIG. 1, the half circle shapes illustrated in FIG. 2, and the u-shapes illustrates in FIGS. 3 and 4. The masses 14, 16 may be of the same approximate size as illustrated in FIG. 2, or the masses 14, 16 may be of respectively different sizes as illustrated in FIGS. 3, 4 and 5.

As described above, in the exemplary AVA 10 of the inventions, the base mass 14 and the absorber mass 16 are not rigidly connected directly to each other. Rather, the base mass 14 and the absorber mass 16 are connected by two switching elements 18, 20 that may be connected is in parallel with respect to each other and between the masses 14, 16. The four elements, 14, 16, 18, and 20 complete a magnetic circuit. When the magnetic field is applied by the magnetic field source 22, the absorber mass 16 is attracted towards the base mass 14.

The switching elements 18, 20 may be composed of "smart materials" to complete the magnetic circuit with the base mass 14 and the absorber mass 16, and also to function as "springs". The switching elements 18, 20 may be any spring-like device with state-dependent static displacement lengths, such as bistable springs, or springs with variable numbers of active coils or close-wound springs. For example, the switching elements 18, 20 may be discrete, noncontinuous iron paths with passive spring(s) used. As another example, any discrete magnetically-conducting path (for example, iron threads in cloth, where no one thread runs from the absorber mass to the base mass) can be placed in parallel with a spring to induce an increased stiffness effect. The switching elements 18, 20 may "match" or be approximately the same in size and composition (or even other characteristics) as illustrated in FIGS. 1, 2, 3, and 4.

Figure 5:
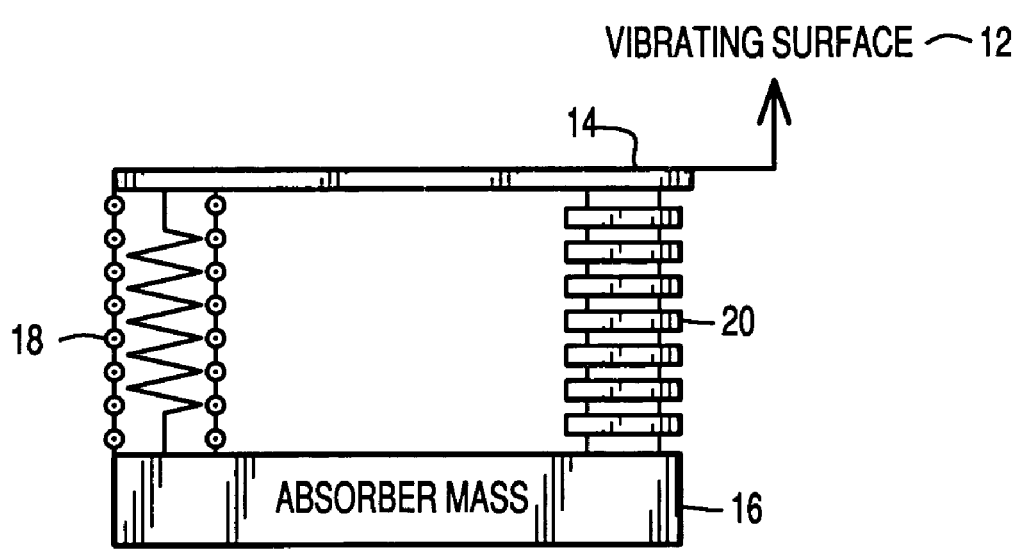
FIG. 5 is a drawing of another exemplary embodiment of the inventions.

Alternatively, one of the switching elements 18, 20 may be different from the other in size, composition or other characteristics as illustrated in FIG. 5 so long as the principles of the inventions are followed. Further, the Figures illustrate two switching elements 18, 20, but more or less switching elements may be used with compliance of the principles of the inventions. The Figures also illustrate the switching elements 18, 20 to be disposed in parallel with respect to each other, but that does not have to be the case so long as the principles of the inventions are followed.

In the exemplary AVA 10, the switching elements 18, 20 are made of a magnetorheological (MR) elastomer, which may be any elastomeric substance mixed with magnetically-conducting particles prior to curing. After the cure, the magnetically-conducting particles are no longer able to move freely as if they were in a fluid suspension. The MR elastomer may not be structurally rigid, nor may the elastomeric substance be magnetically-conducting. Examples of elastomeric substances include silicone gels, and natural or synthetic rubbers. The magnetically-conducting parties used with the elastomeric substance in the MR elastomer should be sufficiently small so as not to run the length (between the masses 14, 16) of the MR elastomer's body. Examples of magnetically-conducting materials include iron micropowder, and low-carbon steel power or shavings.

The MR elastomer of the exemplary embodiment uses a two-part silicone gel known as GE Silicone RTV6186. The silicone gel is embedded with iron particles that become aligned in chains. When a magnetic flux path flows through this composite material, the magnetic forces oppose any displacement the iron particles experience away from their magnetic equilibrium point. The magnetic strength forces the composite material to statically compress. This causes the effective stiffness of the silicone to increase. Another cause of the change in stiffness is due to the magnetic poles on the masses 14, 16.

In the exemplary AVA 10, the MR elastomer was prepared by mixing a desired percent iron to part B of a two-part silicone mixture. As noted, the silicone was GE Silicone RTV6186, and the iron was from ISP Technologies, R 1430. An equal mass part A was added to the mixture. The silicone was mixed for ten minutes on a hot plate heated to 50 degrees Celsius. The silicone mixture was then cured for thirty minutes at an elevated temperature while a large coil had 4.5 A current running through it, magnetically saturating the iron particles and forcing them to align in chains. The silicone produced was cylindrical. Once cured, the silicone was cut in half length-wise and each half was secured to the masses 14, 16 using Loctite 454 epoxy.

Also in the exemplary AVA 10, and with respect to the percent of iron in the silicone mixture, a 5:1 maximum to minimum frequency ratio could be achieved by using the 30–35% iron by volume range with the best iron percent to be around 35% iron fraction by volume. Note: the design is iron-percentage dependent and "best" iron fraction may vary.

In some cases, the absorber mass 16 may be too heavy for a silicone mixture in the switching elements 18, 20 to support. Talc powder may be added to strengthen the silicone when not enough iron powder could otherwise be present, i.e., for small percentages of iron. Otherwise, the iron powder provides strengthening for the silicone and a means for magnetic flux to pass through what would otherwise be effectively an air gap.

An MR elastomer of length 1 whose stiffness change is directly proportional to the magnetic flux that runs through it should have a maximum flux change for the least amount of power input. Therefore, two MR elastomers can be placed in parallel as seen in the exemplary AVA 10.

FIG. 1 illustrates a magnetic field source 22 for inducing and/or changing the magnetic flux in the magnetic circuit of the exemplary AVA 10. The exemplary embodiment includes a coil of current-bearing wire (also referred to as magnet wire or a solenoid) as the magnetic field source 22 as illustrated in FIGS. 2 and 3. The coil of current-bearing wire (and any other magnetic field source 22) may be disposed about the base mass 14 as illustrated in FIG. 2 or about the absorber mass 16 as illustrated in FIG. 3. A design constraint on the magnetic field source 22 is that its placement should not affect the motion of the switching elements 13, 20.

Changing the magnetic flux, as noted above, changes the frequency of vibration absorption by the AVA 10. When the magnetic field is applied, the MR elastomer of the switching elements 18, 20 of the exemplary AVA. 10 is saturated. In other words, when current flows through the coils of the exemplary magnetic field source 22, the exemplary AVA 10 experiences a relatively large stiffness increase. The large stiffness increase is generated because the elastomer motion is not limited by the geometric constraints.

It should be emphasized that the above-described embodiments of the present invention are merely possible examples of implementations, merely set forth for a clear understanding of the principles of the invention. Many variations and modifications may be made to the above-described embodiments of the invention without departing substantially from the principles of the invention. All such modifications and variations are intended to be included herein within the scope of this disclosure and protected by the following claims.

We claim:

1. A vibration absorber for absorbing vibrations over a range of frequencies from a vibrating device, comprising:
    a base mass for attachment to the vibrating device;
    an absorber mass;
    at least an element connected between the base mass and the absorber mass;
    a magnetic flux path through the base mass, the absorber mass, and the element for conducting a magnetic flux;
    the magnetic flux being changeable in response to a change in frequency from the vibrating device; and
    the element being switchable in response to a change of the magnetic flux in the magnetic flux path,
    whereby the vibrations over the range of frequencies from the vibrating device may be absorbed by the switchability of the element in response to the changeability of the magnetic flux in the magnetic flux path.

2. The vibration absorber of claim 1, wherein the element comprises a pair of elements.

3. A vibration absorber for absorbing vibrations over a range of frequencies from a vibrating device, comprising:
    a base for attachment to the vibrating device;
    an absorber;
    at least an element connected between the base and the absorber, wherein the element comprises a substance mixed with magnetically-conducting particles that an unable to move freely;
    a magnetic flux path through the base, the absorber and the element for conducting a magnetic flux;
    the magnetic flux being changeable in response to a change in frequency from the vibrating device; and
    the element being switchable in response to a change of the magnetic flux.

4. The vibration absorber of claim 3, wherein the substance comprises an elastomeric substance mixed with cured magnetically-conducting particles so the magnetically-conducting parties are unable to move freely.

5. The vibration absorber of claim 4 wherein the elastomeric substance comprises a magnetorheological (MR) elastomer.

6. The vibration absorber of claim 1, wherein the base mass and/or the absorber mass are relatively rigid.

7. The vibration absorber of claim 1, wherein the base mass and/or the absorber mass comprise magnets.

8. The vibration absorber of claim wherein the magnetic field source comprises a coil of current-bearing wire encircling the base mass and/or the absorber mass.

9. The vibration absorber of claim 1, wherein the base mass and/or the absorber mass comprises iron or low carbon steel.

10. The vibration absorber of claim 1, wherein the element is not geometrically constrained.

11. The vibration absorber of claim wherein the base mass and/or the absorber mass comprises a magnet.

12. A vibration absorber for absorbing vibrations over a range of frequencies from a vibrating device, comprising:
    a base for attachment to the vibrating device;
    an absorber;
    at least an element connected between the base and the absorber;
    a magnetic flux path through the base the absorber and the element for conducting a magnetic flux;
    the magnetic flux being changeable in response to a change in frequency from the vibrating device; and
    the element being switchable in response to a change of the magnetic flux in the magnetic flux path, and wherein a stiffness change in the element is directly proportional to the magnetic flux that runs through the element.

13. A method to absorb vibrations of a specific frequency from a vibrating device, comprising:
    attaching a vibration absorber to the vibrating device;
    applying a magnetic field to the vibration absorber to induce a magnetic flux in the vibration absorber; and
    causing the vibration absorber to proportionally in stiffness change in response to inducement of the magnetic flux so that the vibration absorber absorbs the vibrations of the specific frequency from the vibrating device.

14. The method of claim 13, wherein causing the vibration absorber to change in response to the inducement of the magnetic flux comprises causing at least an element of the vibration absorber to change in static deflection length in response to the inducement of the magnetic flux so that the vibration absorber absorbs the vibrations of the specific frequency from the vibrating device.

15. A method to absorb vibrations from a vibrating device over a range of frequencies, comprising:
attaching a vibration absorber to the vibrating device;
with respect to absorbing vibrations from the vibrating device at a specific frequency in the range of frequencies, inducing a specific magnetic flux in the vibration absorber;
causing the vibration absorber to change in response to inducement of the specific magnetic flux so that the vibration absorber absorbs the vibrations at the specific frequency;
in response to detection of a change in frequency of the vibrations from the vibrating device, inducing a magnetic flux correlated to the changed frequency in the vibration absorber; and
causing the vibration absorber to change in response to the inducement of the magnetic flux correlated to the changed frequency so that the vibration absorber absorbs the vibrations at the changed frequency.

16. The method of claim 15, wherein causing the vibration absorber to change in response to inducement of the specific magnetic flux comprises causing at least an element of the vibration absorber to change in static deflection length in response to the inducement of the specific magnetic flux so that the vibration absorber absorbs the vibrations at the specific frequency.

17. The method of claim 15, wherein causing the vibration absorber to change in response to the inducement of the magnetic flux correlated to the changed frequency comprises causing at least an element of the vibration absorber to change in static deflection length in response to the inducement of the magnetic flux correlated to the changed frequency so that the vibration absorber absorbs the vibrations at the changed frequency.

* * * * *